US009814216B2

(12) United States Patent
Byrne et al.

(10) Patent No.: US 9,814,216 B2
(45) Date of Patent: Nov. 14, 2017

(54) ROPE PET TOY WITH ATTACHED FABRIC HEAD

(71) Applicant: C.B. Worldwide, Inc., Mammoth Lakes, CA (US)

(72) Inventors: Charles A. Byrne, Mammoth Lakes, CA (US); Jose Luis Andreu, El Paso, TX (US)

(73) Assignee: C.B. Worldwide, Inc., Mammoth Lakes, CA (US)

( * ) Notice: Subject to any disclaimer, the term of this patent is extended or adjusted under 35 U.S.C. 154(b) by 90 days.

(21) Appl. No.: 14/823,298

(22) Filed: Aug. 11, 2015

(65) Prior Publication Data

US 2017/0042122 A1 Feb. 16, 2017

(51) Int. Cl.
*A01K 15/02* (2006.01)
*B29C 35/00* (2006.01)
*B29L 31/52* (2006.01)

(52) U.S. Cl.
CPC ............ *A01K 15/026* (2013.01); *B29C 35/00* (2013.01); *B29L 2031/529* (2013.01)

(58) Field of Classification Search
CPC .......................... A01K 15/025; A01K 15/026
USPC ................ 119/702, 707, 708, 709, 710, 711; 446/204, 213, 216, 184, 183
See application file for complete search history.

(56) References Cited

U.S. PATENT DOCUMENTS

| | | | | | |
|---|---|---|---|---|---|
| 1,324,646 | A | * | 12/1919 | Clements | A63H 3/24 446/183 |
| 4,770,123 | A | * | 9/1988 | Bell | A01K 15/025 119/709 |
| 5,560,320 | A | * | 10/1996 | Plunk | A01K 15/026 119/709 |
| 6,681,721 | B1 | * | 1/2004 | Buschy | A01K 15/02 119/707 |
| 7,878,151 | B2 | * | 2/2011 | Tsengas | A01K 15/025 119/707 |
| 2003/0213440 | A1 | * | 11/2003 | Kelly | A01K 15/025 119/708 |
| 2005/0268861 | A1 | * | 12/2005 | Ritchey | A01K 15/026 119/707 |
| 2009/0205579 | A1 | * | 8/2009 | Hirschberg | A01K 13/004 119/707 |

* cited by examiner

*Primary Examiner* — Trinh Nguyen
(74) *Attorney, Agent, or Firm* — Hackler Daghighian Martino & Novak

(57) ABSTRACT

A pet toy includes a flexible pocket having a proximal end opposite a distal end. A single opening is formed at the proximal end, where the single opening leads to an inner chamber closed at the distal end. A rope pet toy body includes a prolongated end which is partially disposed within the single opening of the pocket allowing a first portion of the pocket along the proximal end to overlay a second portion of the prolongated end. A cylindrically-shaped, heat shrinkable film is disposed over both the first portion of the proximal end of the single opening and the second portion of the prolongated end. The heat shrinkable film has been heated and shrunk fit onto both the proximal end of the pocket and the prolongated end of the rope pet toy body thereby joining the pocket to the rope pet toy body.

12 Claims, 6 Drawing Sheets

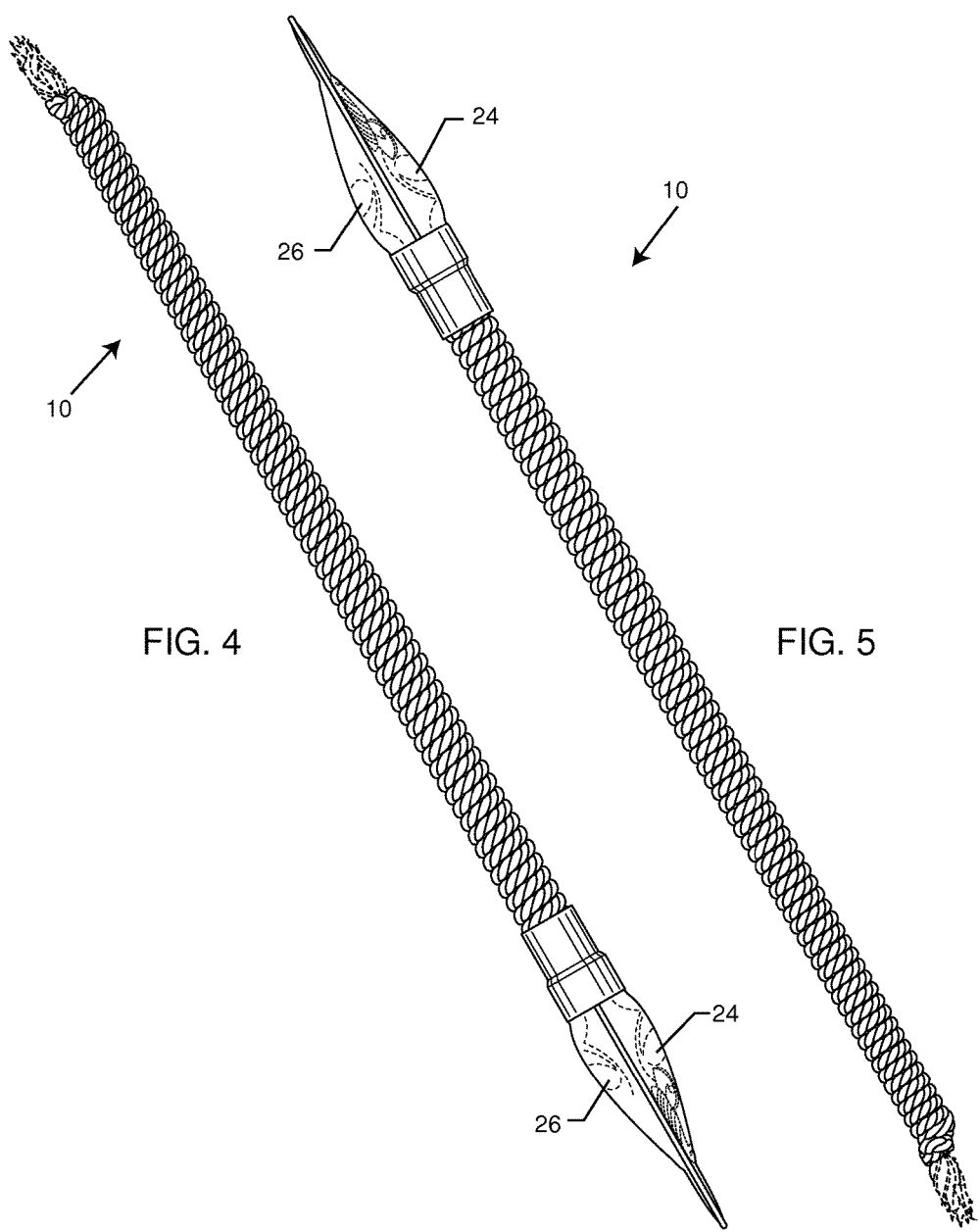

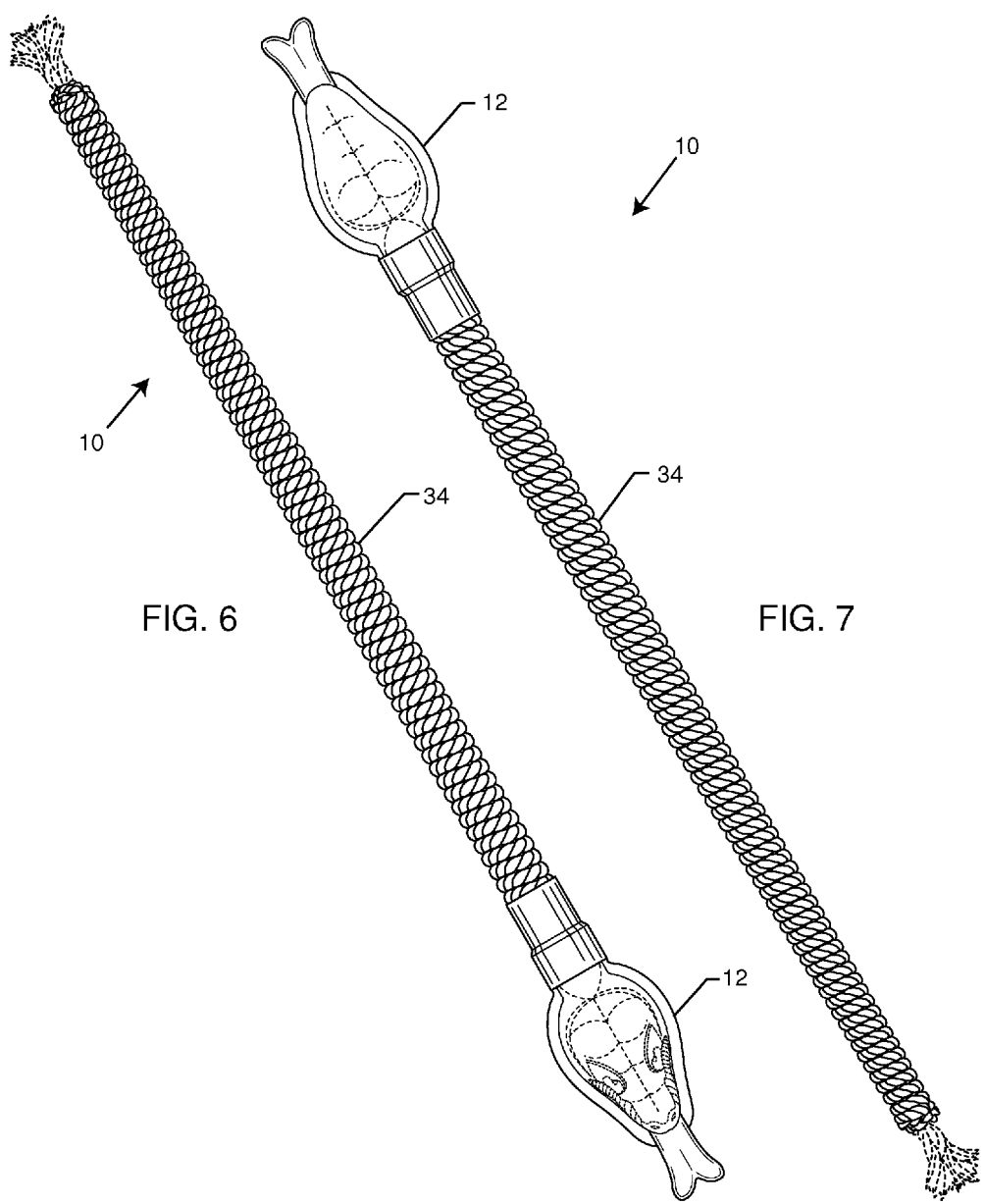

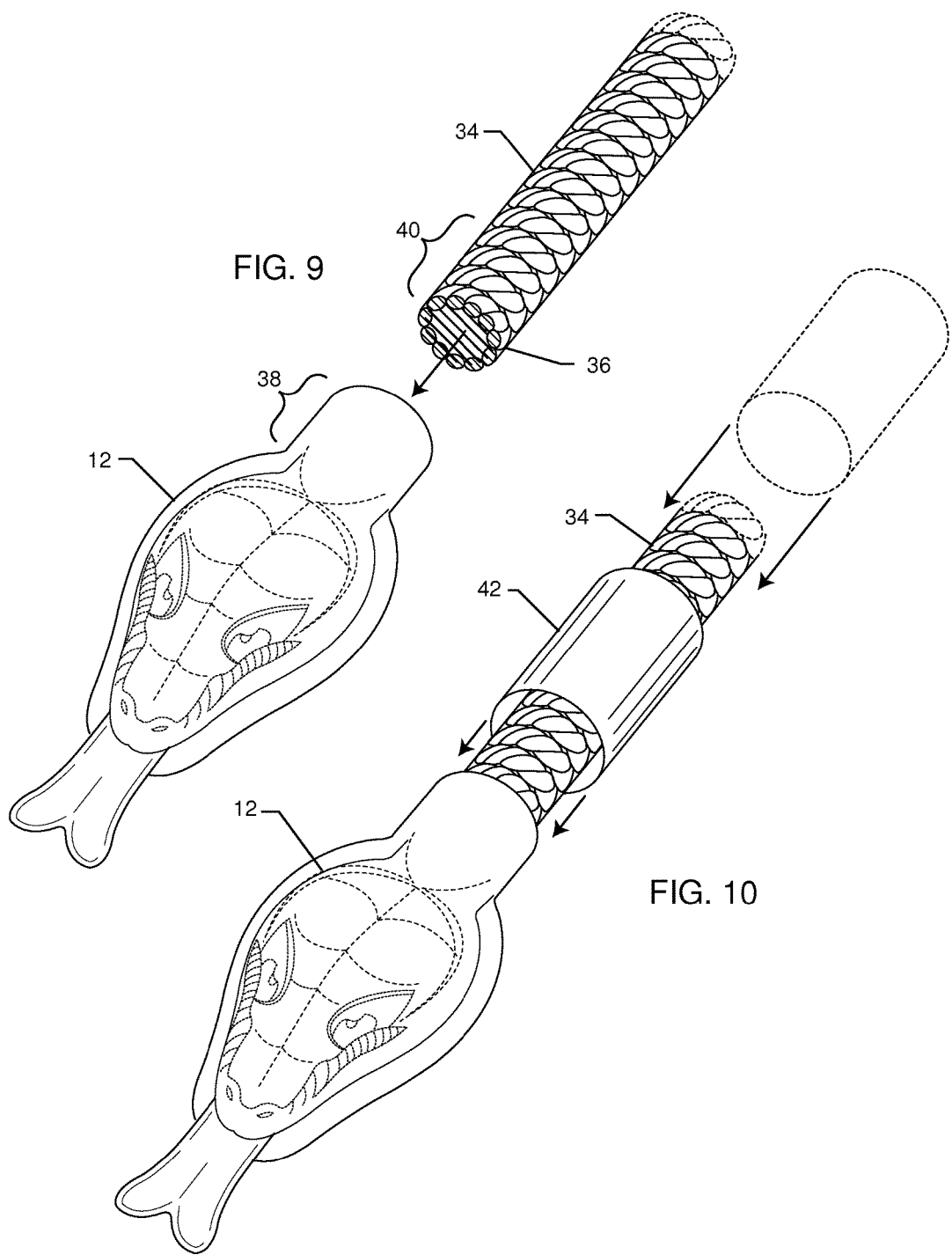

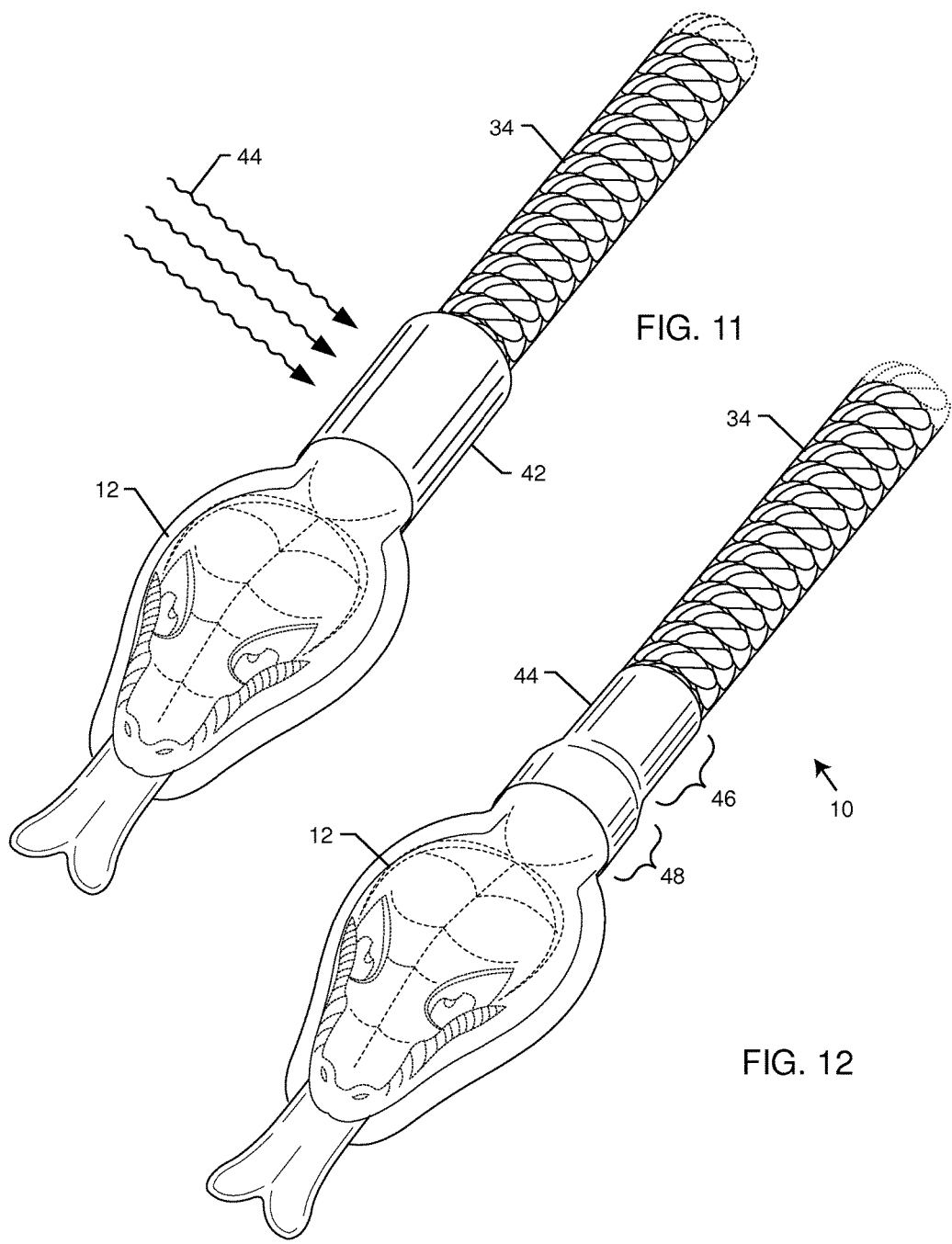

ROPE PET TOY WITH ATTACHED FABRIC HEAD

CROSS-REFERENCE TO RELATED APPLICATIONS

None

FIELD OF THE INVENTION

The present invention generally relates to pet toys. More particularly, the present invention relates to a pet toy with a composite structure combining a fabric head formed into a pocket that is heat shrunk onto a rope body.

BACKGROUND OF THE INVENTION

Pet toys are a huge industry in the marketplace. Companies that produce pet toys are always searching for new and innovative designs that would inspire one's pet to play with it. The present invention fulfills these needs and provides other related advantages.

SUMMARY OF THE INVENTION

An exemplary embodiment of a pet toy includes a flexible pocket having a proximal end opposite a distal end. A single opening is formed at the proximal end, where the single opening leads to an inner chamber closed at the distal end. A rope pet toy body includes a prolongated end which is partially disposed within the single opening of the pocket allowing a first portion of the pocket along the proximal end to overlay a second portion of the prolongated end. A cylindrically-shaped, heat shrinkable film is disposed over both the first portion of the proximal end of the single opening and the second portion of the prolongated end. The heat shrinkable film has been heated and shrunk fit onto both the proximal end of the pocket and the prolongated end of the rope pet toy body thereby joining the pocket to the rope pet toy body.

In other embodiments, a compressible squeaker may be disposed within the pocket. Additionally, stuffing may be disposed within the pocket.

The air permeable pocket may include indicia resembling a head of an animal. The rope pet toy body may be formed into a shape resembling the body of the animal. The animal is a snake.

The pocket may be made from an air permeable material. The air permeable material may be a natural or a synthetic fabric. The inner chamber is fully enclosed by the air permeable material except for the single opening at the proximal end. The pocket may be comprised of a first fabric sheet attached to a second fabric sheet. The first fabric sheet may be bonded, adhered, glued, stitched, melted or fastened to the second sheet along a perimeter of the pocket starting and ending at each side of the single opening.

An exemplary method of producing the pet toy includes the steps of: forming a flexible pocket comprising a proximal end opposite a distal end, where a single opening is formed at the proximal end, and where the single opening leads to an inner chamber closed at the distal end; placing a stuffing within the pocket; placing a compressible squeaker within the pocket; forming a rope pet toy body including a prolongated end; placing the prolongated end of the rope pet toy body partially within the single opening of the pocket allowing a first portion of the pocket along the proximal end to overlay a second portion of the prolongated end of the rope pet toy body; placing a cylindrically-shaped, heat shrinkable film over both the first portion of the proximal end of the single opening and the second portion of the prolongated end of the rope pet toy body; and heating the heat shrinkable film with hot air allowing it to be heated and shrunk fit onto both the proximal end of the pocket and the prolongated end of the rope pet toy body thereby joining the pocket to the rope pet toy body.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 4 is a left side view of FIG. 1;

FIG. 5 is a right side view of FIG. 1;

FIG. 6 is a top plan elevation view of FIG. 1;

FIG. 7 is a bottom plan elevation view of FIG. 1;

FIG. 9 is a partially-assembled, perspective view of the structure of FIG. 1 where the rope body is about to be inserted into the pocket head structure;

FIG. 10 is a partially-assembled, perspective view of the structure of FIG. 1 with the heat shrink tubing not yet installed;

FIG. 11 is a partially-assembled, perspective view of the structure of FIG. 1 now with the heat shrink tubing being heated; and FIG. 12 is a fully-assembled, perspective view of the structure of FIG. 1 and the resulting structure of FIGS. 9-11 now with the heat shrink tubing permanently attaching the head to the body.

DETAILED DESCRIPTION OF THE PREFERRED EMBODIMENTS

FIGS. 1-7 are various views of an exemplary composite head and body pet toy 10. FIGS. 8-12 show the various stages of how to assemble the pet toy 10 and its inner parts which will be further discussed herein.

Figure 1:
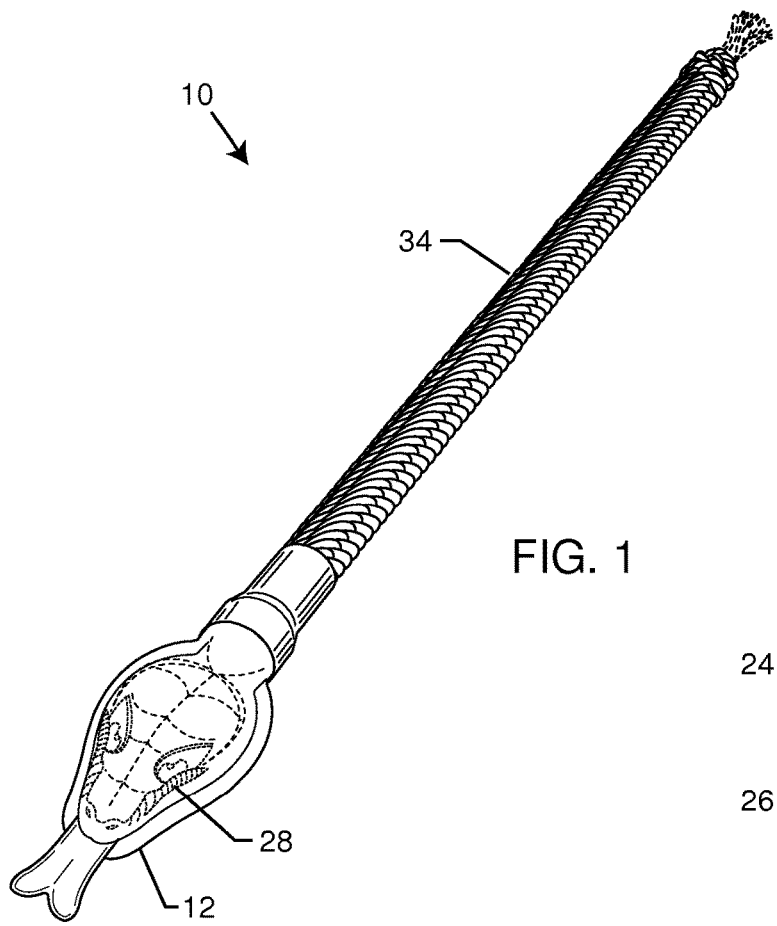
FIG. 1 is a perspective view of an embodiment of a composite head and body pet toy.
Figure 2:
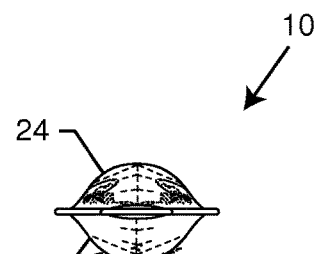
FIG. 2 is a front elevation view of FIG. 1.
Figure 3:
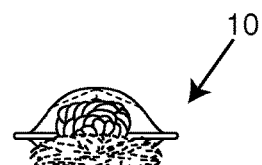
FIG. 3 is a rear elevation view of FIG. 1.
Figure 8:
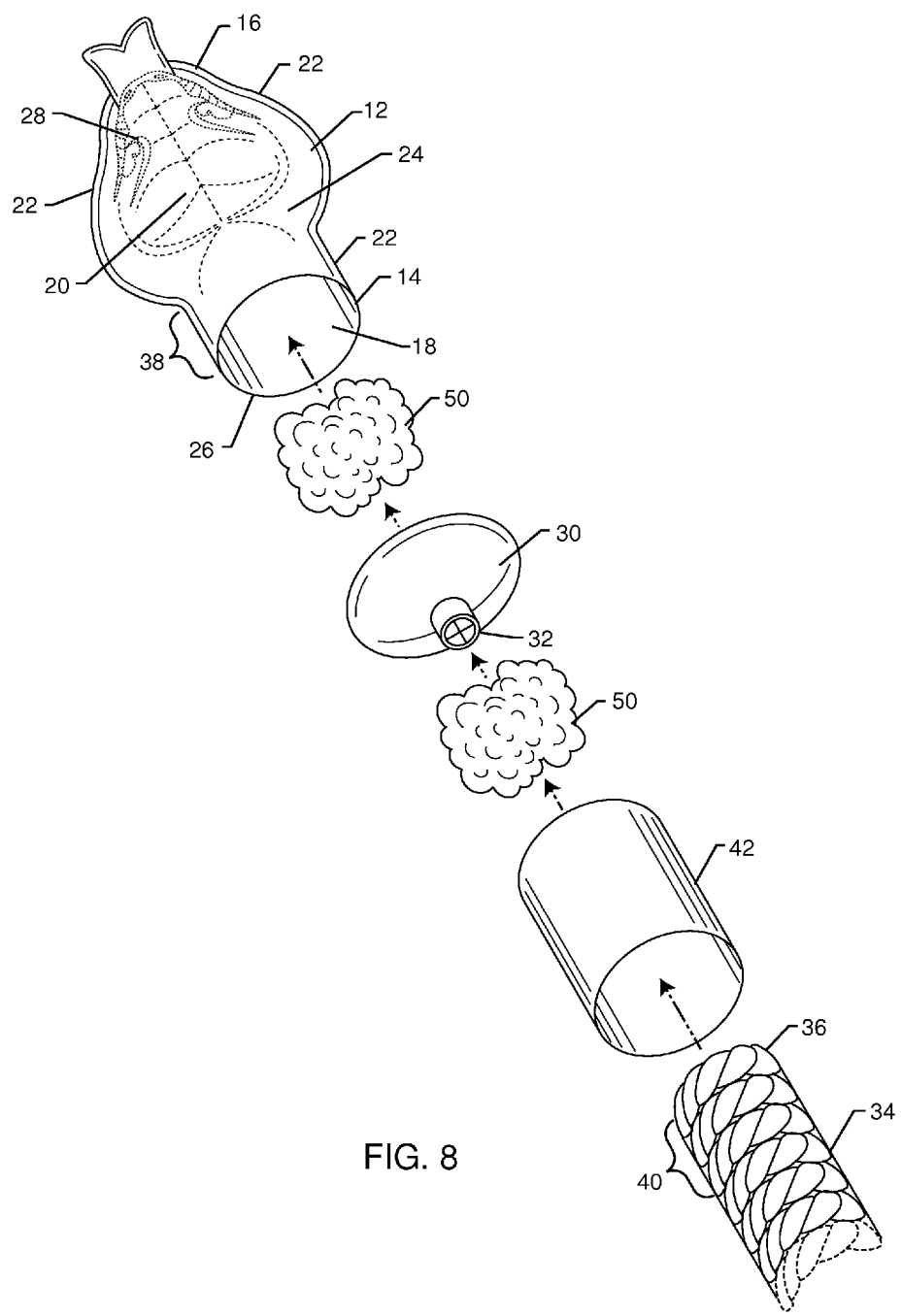
FIG. 8 is an exploded, perspective view of the structure of FIG. 1.

As best seen in FIG. 8, the exemplary embodiment of a pet toy 10 includes a flexible pocket/head 12 having a proximal end 14 opposite a distal end 16. A single opening 18 is formed at the proximal end 14, where the single opening 18 leads to an inner chamber closed 20 at the distal end 16.

Alternatively, the pocket 12 may be made from an air permeable material. The reason the pocket 14 may be air permeable is such that it allows sound and air to easily pass there through which is needed for the squeaker 30 located inside. The squeaker 30 makes a squeaking sound when it is manually compressed and/or released by a user or a pet. It does this by allowing air to enter and exit the port 32. The air permeability of the fabric allows sound and air to easily pass there through whereas an air impermeable fabric would reduce such operations and reduce the effectiveness of the squeaker 30.

Alternatively, the fabric of the pocket 12 may be made from a generally air impermeable material, but still allow sound to pass there through. As can be seen, many variations of fabrics may be used that allow the squeaker 30 to function once inside the flexible pocket 12.

The air permeable material may be a natural fabric or a synthetic fabric. The inner chamber 20 is fully enclosed by the air permeable material along its perimeter 22, except for the single opening 18 at the proximal end 14. The pocket 12 may be comprised of a first fabric sheet 24 attached to a second fabric sheet 26. The first fabric sheet 24 may be bonded, adhered, glued, stitched, melted or fastened to the second fabric sheet 26 along the perimeter 22 of the pocket 14 starting and ending at each side of the single opening 18. Alternatively, the pocket 14 may be made from a single piece of fabric (not shown) that is then folded and stitched into the shapes as shown herein. As can be appreciated, a multiple amount of sheets of fabric could also be used to form the flexible pocket 12.

The air permeable pocket 14 may include indicia 28 resembling a head of an animal. As shown herein the indicia 14 resembles that of a snake. Alternatively, other animals may be depicted such as other reptiles and amphibians. It is even possible for the indicia 14 to resemble birds, fish, insects, mammals and even fantasy or mythical creatures such as dragons, aliens or various cartoon characters.

The pet toy 10 has a rope body 34 that may be formed into a shape resembling the body of the animal. As shown herein the animal body is that of a snake. The body 34 is comprised of a single or a multiple rope structure that is tied and formed to resemble certain animal bodies such as snakes, reptiles and amphibians or other animals as already discussed.

As best shown in FIG. 9, the rope body 34 includes a prolongated end 36 which is partially disposed within the single opening 18 of the pocket 12 allowing a first portion 38 of the pocket 12 along the proximal end 14 to overlay a second portion 40 of the prolongated end 36. It is noted that the second portion 40 of the prolongated end 36 is generally cylindrically shaped such that it can fit into the similarly shaped cylindrical end of the first portion 38 of the pocket 12.

As best shown in FIG. 10, a cylindrically-shaped, heat shrinkable film 42 is disposed over both the first portion 38 of the proximal end 14 of the single opening 18 and the second portion 40 of the prolongated end 36. As best shown in FIG. 11, heat 44 from a heat gun or similar device may be applied to the heat shrinkable film 42 which will then shrink and become shrunk fit onto both the proximal end 14 of the pocket 12 and the prolongated end 36 of the rope body 34 thereby joining the pocket 12 to the rope body 34 thereby forming the pet toy 10. In these embodiments, the heat shrinkable film 44 is directly gripping a portion 46 of the rope body 34 and also a portion 48 of the flexible pocket 12. In this way a secure attachment is achieved between the rope body 34 and the pocket 12.

Referring back to FIG. 8, before the elongated end 36 is joined to the pocket 12, the squeaker 30 and/or a stuffing 50 may be placed inside the pocket 12. The squeaker 30 and the stuffing 50 helps to add volume to the pocket 12 such that it better resembles a real animal and also provides resistance for the pet to bite into. Alternatively, stuffing 50 alone or a squeaker 30 alone may be disposed within the pocket 12.

The material of the pocket 12, the heat shrinkable film 42 and the rope body 34 must be of sufficient rugged construction such that rough use by a pet does not easily rip or destroy the various structures. This product may be used by dogs which will bite, rip and tear at the pet toy 10 during play. Therefore, these materials used cannot be easily distorted or ripped. Yet, these materials must be sufficiently pliable and flexible such that they do not injure the pet during use.

In summary, an exemplary method of producing the pet toy 10 includes the steps of: forming a flexible pocket 12 comprising a proximal end 14 opposite a distal end 16, where a single opening 18 is formed at the proximal end 14, and where the single opening 18 leads to an inner chamber 20 closed at the distal end 16; placing a stuffing 50 within the pocket 12; placing a compressible squeaker 30 within the pocket 12; forming a rope pet toy body 34 including a prolongated end 36; placing the prolongated end 36 of the rope pet toy body 34 partially within the single opening 18 of the pocket 12 allowing a first portion 38 of the pocket 12 along the proximal end 14 to overlay a second portion 40 of the prolongated end 36 of the rope pet toy body 34; placing a cylindrically-shaped, heat shrinkable film 42 over both the first portion 38 of the proximal end 14 of the single opening 18 and the second portion 40 of the prolongated end 36 of the rope pet toy body 34; and heating 44 the heat shrinkable film 42 with hot air allowing it to be heated and shrunk onto both the proximal end 14 of the pocket 12 and the prolongated end 36 of the rope pet toy body 34 thereby joining the pocket 12 to the rope pet toy body 34 and forming the pet toy 10.

Although several embodiments have been described in detail for purposes of illustration, various modifications may be made to each without departing from the scope and spirit of the invention. Accordingly, the invention is not to be limited, except as by the appended claims.

NUMERALS 10 pet toy
12 flexible pocket/head
14 proximal end
16 distal end
18 single opening
20 inner chamber
22 perimeter
24 first fabric sheet
26 second fabric sheet
28 indicia of a head
30 squeaker
32 port, squeaker
34 rope body
36 prolongated end
38 first portion, pocket
40 second portion, prolongated end
42 heat shrinkable film
44 heat
46 portion of elongated end for attachment by heat shrink film
48 portion of pocket for attachment by heat shrink film
50 stuffing

What is claimed is:

1. A pet toy, comprising:
   a flexible pocket comprising a proximal end opposite a distal end, where a single opening is formed at the proximal end, and where the single opening leads to an inner chamber closed at the distal end;
   a rope pet toy body including a prolongated end;
   wherein the prolongated end is partially disposed within the single opening of the pocket allowing a first portion of the pocket along the proximal end to overlay a second portion of the prolongated end of the rope pet toy body;
a cylindrically-shaped, heat shrinkable film disposed over both the first portion of the proximal end of the single opening and the second portion of the prolongated end of the rope pet toy body;
wherein the heat shrinkable film has been heated and shrunk fit onto both the proximal end of the pocket and the prolongated end of the rope pet toy body thereby joining the pocket to the rope pet toy body.

2. The pet toy of claim 1, including a compressible squeaker disposed within the pocket.

3. The pet toy of claim 2, including a stuffing disposed within the pocket.

4. The pet toy of claim 3, wherein the pocket includes indicia resembling a head of an animal.

5. The pet toy of claim 4, wherein the rope pet toy body is formed into a shape resembling the body of the animal.

6. The pet toy of claim 5, wherein the animal is a snake.

7. The pet toy of claim 1, wherein the pocket is made from an air permeable material.

8. The pet toy of claim 7, wherein the air permeable material is a natural or a synthetic fabric.

9. The pet toy of claim 8, wherein the inner chamber is fully enclosed by the air permeable material except for the single opening at the proximal end.

10. The pet toy of claim 7, wherein the pocket is comprised of a first fabric sheet attached to a second fabric sheet.

11. The pet toy of claim 10, wherein the first fabric sheet is bonded, adhered, glued, stitched, melted or fastened to the second sheet along a perimeter of the pocket starting and ending at each side of the single opening.

12. A pet toy, comprising:
a flexible and air permeable pocket comprising a proximal end opposite a distal end, where a single opening is formed at the proximal end, where the single opening leads to an inner chamber closed at the distal end, where the pocket is comprised of a first fabric sheet attached to a second fabric sheet along a perimeter which starts and ends at the single opening, and where the pocket includes indicia resembling a head of a snake;
a stuffing disposed within the pocket;
a compressible squeaker disposed within the pocket;
a rope pet toy body including a prolongated end, wherein the rope pet toy body resembles a body of the snake;
wherein the prolongated end is partially disposed within the single opening of the pocket allowing a first portion of the pocket along the proximal end to overlay a second portion of the prolongated end of the rope pet toy body;
a cylindrically-shaped, heat shrinkable film disposed over both the first portion of the proximal end of the single opening and the second portion of the prolongated end of the rope pet toy body;
wherein the heat shrinkable film has been heated and shrunk fit onto both the proximal end of the pocket and the prolongated end of the rope pet toy body thereby joining the pocket to the rope pet toy body.

\* \* \* \* \*